(12) United States Patent  (10) Patent No.: US 7,044,534 B2
Ishibashi et al.  (45) Date of Patent: May 16, 2006

(54) CONSTRUCTION MACHINE WITH FRONT WINDOW-LOCKING DEVICE

(75) Inventors: Chuichi Ishibashi, Hiroshima (JP); Yoshiaki Murakami, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 298 days.

(21) Appl. No.: 10/645,541

(22) Filed: Aug. 22, 2003

(65) Prior Publication Data
US 2005/0029834 A1  Feb. 10, 2005

(30) Foreign Application Priority Data
Aug. 27, 2002 (JP) ............................. 2002-246269

(51) Int. Cl.
*B62D 33/06* (2006.01)
(52) U.S. Cl. .................. 296/190.1; 49/394; 70/109
(58) Field of Classification Search ............ 296/190.1, 296/96.21, 89, 96.2; 49/394, 395; 70/237, 70/101, 109
See application file for complete search history.

(56) References Cited
U.S. PATENT DOCUMENTS

| | | | |
|---|---|---|---|
| 1,693,912 A | 12/1928 | Worthen | |
| 5,362,118 A * | 11/1994 | Houriez | 296/96.21 |
| 6,030,024 A | 2/2000 | Schmidhuber et al. | |
| 6,101,853 A | 8/2000 | Herr | |
| 6,474,705 B1 * | 11/2002 | Mori et al. | 292/216 |

FOREIGN PATENT DOCUMENTS

| | | |
|---|---|---|
| DE | 44 04 415 | 8/1995 |
| EP | 0 987 390 | 3/2000 |
| EP | 1 001 094 | 5/2000 |
| GB | 2 346 175 | 8/2000 |
| JP | 57-77573 | 5/1982 |
| JP | 5-22630 | 6/1993 |
| JP | 7-4557 | 1/1995 |
| JP | 8-312220 | 11/1996 |

* cited by examiner

*Primary Examiner*—Joseph D. Pape
(74) *Attorney, Agent, or Firm*—Oblon, Spivak, McClelland, Maier & Neustadt, P.C.

(57) ABSTRACT

This invention provides with a construction machine having a front window-locking device comprising locking members rotatably mounted on a window frame of a front window and adapted to secure the front window either in a closed position or in an opened position of the front window and engaging members provided in a cabin to be coupled with the locking members in a locked state, whereby capable of fixing the front window such that it is attracted to a main body of the cabin without rattling.

11 Claims, 5 Drawing Sheets

CONSTRUCTION MACHINE WITH FRONT WINDOW-LOCKING DEVICE

BACKGROUND OF THE INVENTION

1. Field of the Invention

This invention relates to a construction machine with a locking device for a front window of its cabin.

2. Description of the Related Art

Generally, a system for opening and closing a front window of an operator's cab includes a link type and a slide type. A locking device of the front window for the link type comprises locking members with rods at left and right sides of the front window, a coupling member with a coupling hole like a recessed shape at each of left and right sides of the cab, and a pair of links with a coupling hole at both sides. In a closed and an opened position of the front window, the rods are coupled with the holes respectively.

In order to make the rods coupled with the holes easily, the holes are formed in wider length than that of the rods so that there is a certain clearance between the holes and the rods on coupling. As a result, even in a locked state, a rattle of the front window brings about in a range of the clearance.

Especially, during work giving rise to vibration, there is a problem that it leads to noise based on the vibration. Large extent of the noise may cause the front window to be bent partly or broken.

On the other hand, too little clearance may cause the coupling of the rods with the holes to be unstable. Additionally, because of automatic coupling, it is difficult for an operator to recognize a locked state. Unstable locked state may cause the rods to be dropped out of the holes suddenly.

SUMMARY OF THE INVENTION

The present invention has an object to provide a construction machine with a front window-locking device capable of locking a front window firmly without any rattling in a closed and an opened position.

A construction machine with a front window-locking device of the present invention comprises a cabin, a front window for closing an opening at a front part of the cabin, the front window being adapted to be movable between a closed position of fully closing the opening and an opened position of fully opening the opening, locking members rotatably mounted on a window frame of the front window, the locking members being adapted to secure the front window either in the closed position or in the opened position, and engaging members provided in the cabin so as to face the locking members either in the closed position or in the opened position, wherein the locking members are coupled with the engaging members either in the closed position or in the opened position so as to overlap engaging members in a thickness direction of the front window, and wherein surfaces for guidance making the locking members and the engaging members come into contact with each other on locking the front window are provided in one of the engaging members and the locking members.

According to the present invention, since the locking members can be rotated to a locked position either in the closed position or the opened position, the locking members are engaged with the engaging members provided with the cabin so that a locking action is accomplished. In the closed position and the opened position of the front window, the engaging members, for example, are holes for engaging provided with the cabin. Parts of the cabin with the holes act as the engaging members in connection with a link type window.

The locking members are guided through a guide surface formed on at least one of the locking members and the engaging members and finally slides on the engaging members so as to overlap the engaging members in a thickness direction of the front window. Accordingly, any clearance, from which the rattling of the coupling section results, is not generated in the locked state, and thereby the front window is fixed such that it is attracted to the cabin main body. Hence, no rattling occurs at all.

As a result, there are no troubles where the front window vibrates to generate noise, deforms and/or breakdowns by works with troublesome vibration.

Since, moreover, a secure sense or feeling of coupling can be obtained by the handgrip coupling and by the above-mentioned tight contact, and further the coupling can be confirmed with an operator's eye, there are no problems of generating the incomplete coupling as encountered in the prior art, thereby enabling a secure lock to be realized.

DESCRIPTION OF THE PREFERRED EMBODIMENTS

Referring now to FIGS. 1 to 6, an embodiment of a front window-locking device according to the invention is described below. The present invention is not restricted only to such an embodiment.

In the following, the embodiment is exemplified in connection with a front window with a link members as opening/closing means for explanation.

Figure 1:
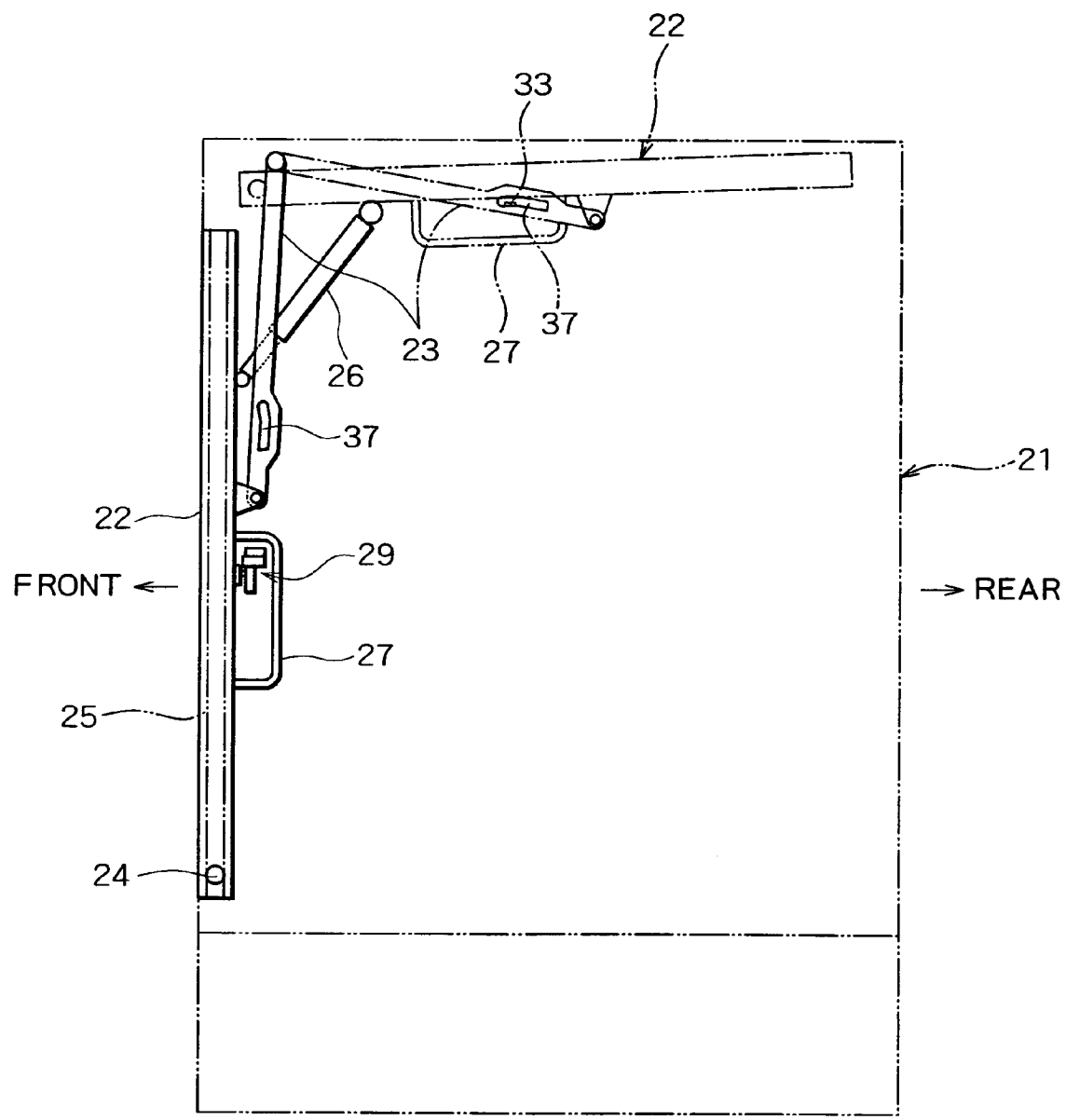
FIG. 1 is a schematic side view of a front window-locking device of a construction machine embodying the present invention.
Figure 2:
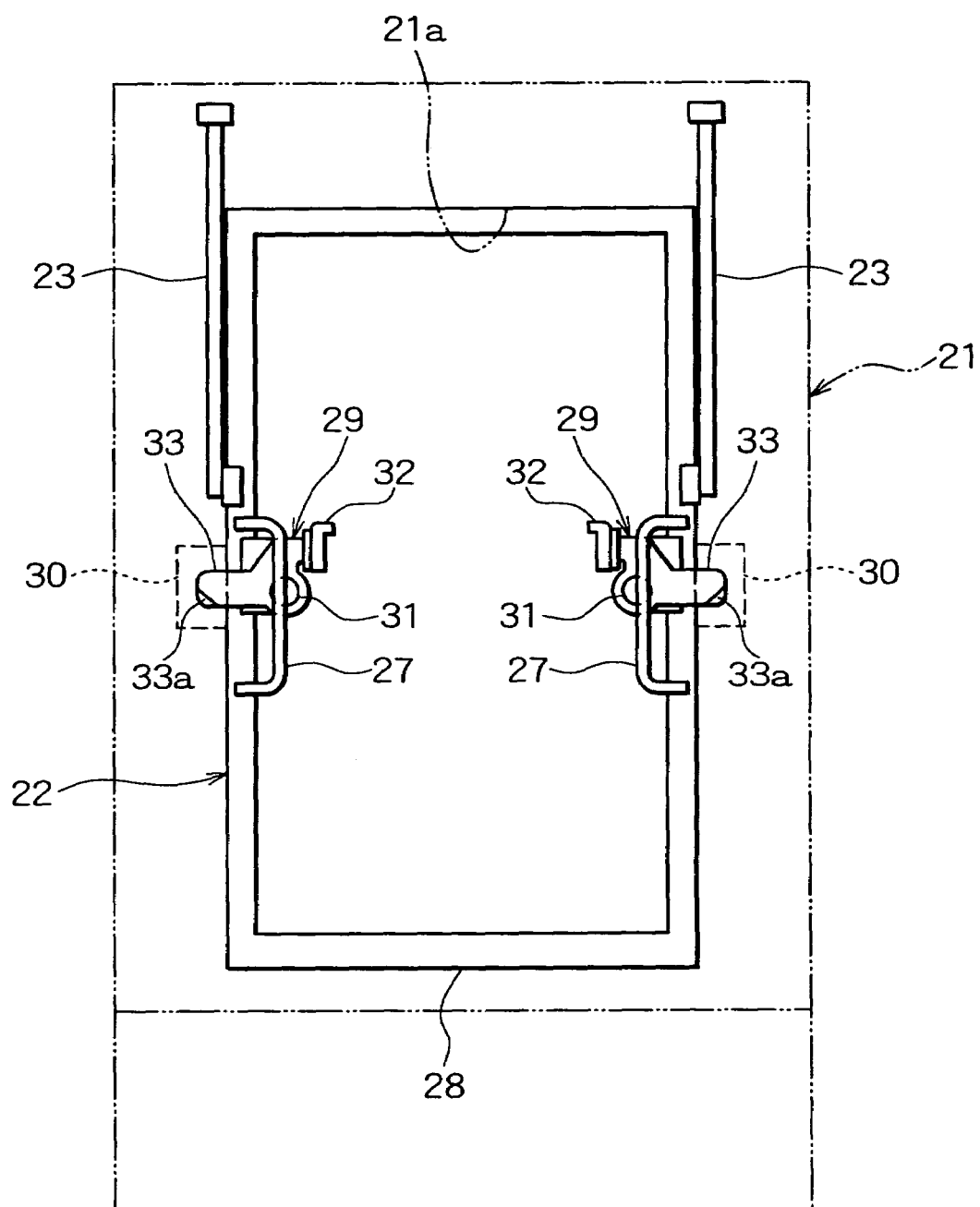
FIG. 2 is a front view of FIG. 1.

In FIGS. 1 and 2, reference numerals 21, 22 and 28 mean a cabin main body as an operator's cab of a constitution machine, a front window and a window frame, respectively. In this case, a glass plate is mounted inside the window frame. For each of paired elements, 23 is a link member; 24 is a roller; 25 is a rail on the side of the cabin main body; 26 is a damper for assisting to open or close the front window; and 27 is a handle for operation of opening or closing the front window. The front window 22 permits to close a front opening 21a of the cabin main body 21. The link members 23 support the front window 22 through the left and right sides thereof, and are pivotedly connected to the upper portion of the cabin main body 21 so as to move pivotedly around supporting points at the upper part of the main body 21. The rollers 24 are disposed on the lower ends of the front window 22 on the left and right sides thereof and are movable on the corresponding rails 25 which guide the rollers 24 through a predetermined range. The rotary movement of the link members 23 in the forward/backward direction and the rolling action of the rollers 24 allow the front window 22 to be moved between an opened position and a closed position. In the closed position, the front window 22 is positioned on the front side of the cabin main body 21, as shown by solid lines in FIG. 1, whereas, in the opened position, the front window 22 is located beneath the ceiling of the cabin, i.e., the upper part of the cabin main body 21, as shown by two-dot lines in FIG. 1 (the front window 22 is accommodated beneath the roof of the cabin). The front window 22 is locked both in the opened position and in the closed position with the aid of a lock device, which is below described in detail. Each damper 26 is interposed between the cabin main body 21 and the front window 22. The dampers 26 are gas springs or the like, and it has a supplementary function of closing/opening the front window 22 with ease. The left and right handles 27 are disposed on the left and right sides of the front window 22, respectively.

Locking members 29, 29 are disposed in a lock mechanism for locking the front window 22 in the closed position, as shown in FIGS. 1 and 2. The locking members 29, 29 are disposed on each intermediate portion of the left and right sides of the window frame 28, i.e., in the vicinity of the left and right handles 27, 27 to manipulate these locking members with the handles 27, 27 gripped by an operator.

Figure 4A:
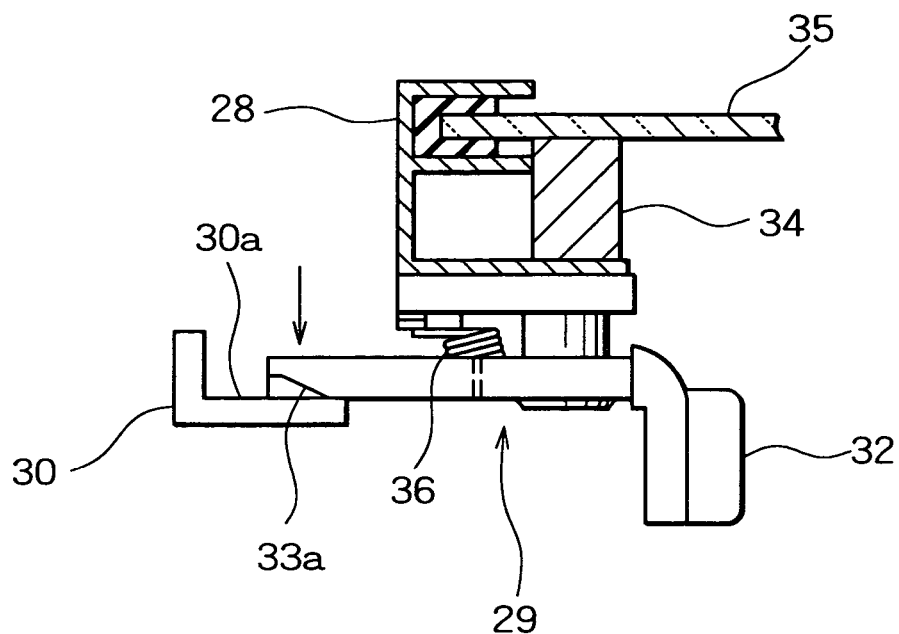
FIGS. 4A and 4B are partly sectional plan views of the same.
Figure 4B:
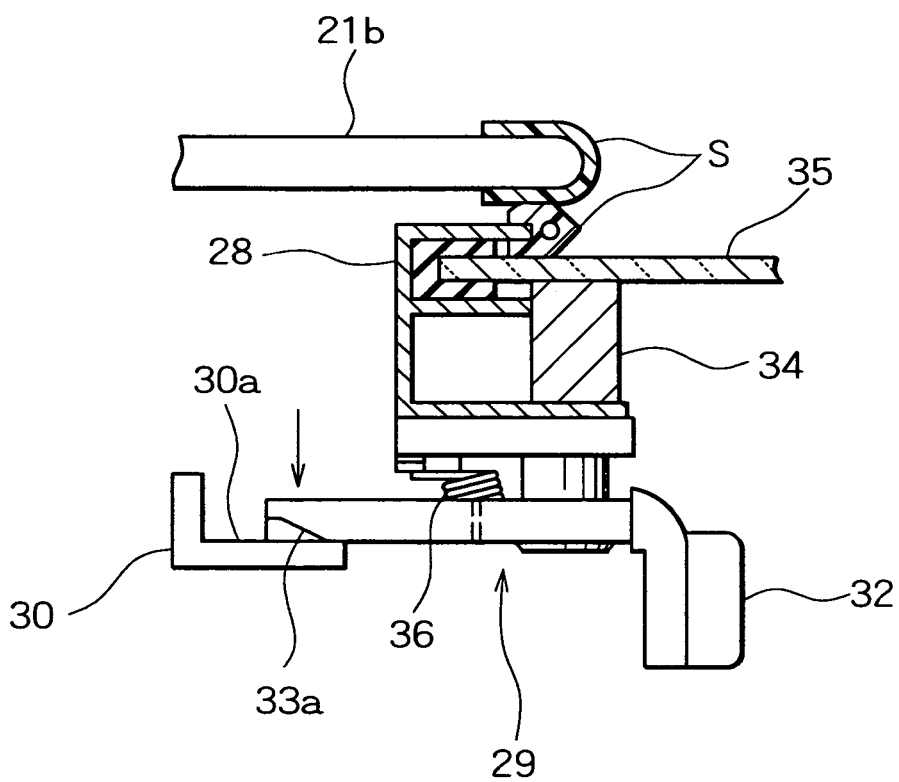

On the other hand, L-shaped engaging members 30, 30, one of which is also shown in FIGS. 4A and 4B, are provided on the side of the cabin main body 21. The engaging members 30, 30 serve as engaging members for the closed position and are disposed so as to face or be opposite to the locking members 29, 29 respectively in the closed position of the front window 22 (in the middle position on its left and right sides).

Figure 3A:
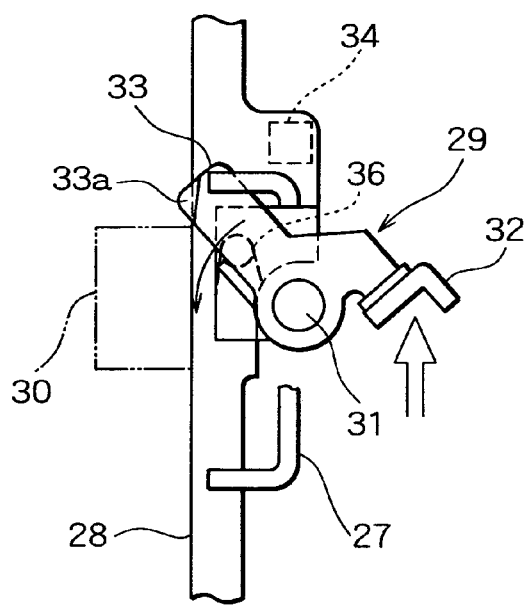
FIG. 3A is a front view showing the locking device in an unlocked state when a front window is closed and FIG. 3B is a front view thereof in a locked state.
Figure 3B:
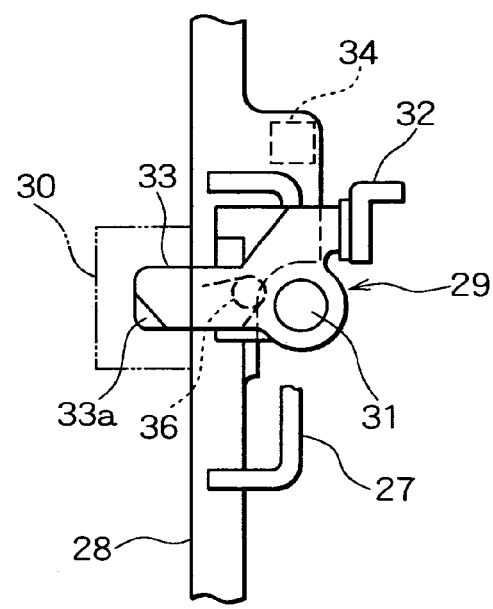

As shown in the magnified drawings of FIGS. 3A and 3B and of FIGS. 4A and 4B, each locking member 29 is mounted such that, with respect to the window frame 28, it is rotatably moved around the horizontal shaft 31 as rotation axis in the thickness direction of the front window (in the direction vertical to the figure plane in FIGS. 3A and 3B) between the lock-releasing or unlocked position shown in FIG. 3A and the locked position shown in FIG. 3B. Reference numeral 32 means a knob for rotary operation. In FIG. 4B, a cabin frame 21b and others are added to the lock mechanism in FIG. 4A in order to indicate the relationship of connection between the lock mechanism and the cabin.

Each locking member 29 comprises the knob 32 and a lock arm 33 disposed opposite to the knob in such a manner that those form one unit. The locking action is operated by coupling the end portion of the lock arm 33 to one side 30a (hereinafter referred to as engaging surface) of the engaging member 30 in such a manner that the end portion is overlapped on the engaging surface.

The end portion of the lock arm 33 coupled to the engaging surface 30a has an inclined surface 33a for guidance (hereinafter referred to as guide surface), which is formed by cutting a part of the end portion obliquely aslant at a corner thereof. In the course of movement from the lock-releasing position shown in FIG. 3A to the locked position shown in FIG. 3B, the end portion of the lock arm which is guided through the guide surface 33a slides on the engaging surface 30a by rotation of the locking member 29 in such a manner that the end portion comes into pressed contact with the engaging surface and then comes to a locked state. In this case, the end portion of the lock arm is guided in a tight or closely contact with the engaging surface 30a so as to rub the surface 30a with a pressure and therefore the window frame 28 is pressed against all over the frame 21b of the cabin securely.

Such a pressed action causes an attraction force to be generated toward the cabin main body 21 for the front window 22 via the locking member 29, and further via a water-proof rubber seal S interposed between the cabin frame 21b and the window frame 28 in the locked state. The attraction force results from a repulsive force against the pressed force by the pressed action in a direction of arrows as shown in FIGS. 4A and 4B. As a result, the front window 22 can be firmly fixed without any rattling.

It is preferable that an elastic member 34 such as a rubber is mounted so as to become in tight contact with the window glass 35 in the vicinity of the portion onto which each locking member is mounted in the window frame 28 on the left and right sides, as shown in FIGS. 4A and 4B. In this case, the mounting portion of the locking member is reinforced with the elastic member 34 and the window glass 35, so that the window frame 28 is not bent partly or transformed in shape even in a case that the attraction force is strong.

In FIGS. 3A and 3B as well as in FIGS. 4A and 4B, reference numeral 36 is a helical spring. The spring serves to stabilize the locking member 29 in the locked state as well as in the lock-releasing state.

In the following, in the opened position of the front window shown by two-dot lines in FIG. 1, a lock mechanism of the present invention, in a case that the front window 22 is locked in the opened position, is described below.

Figure 5:
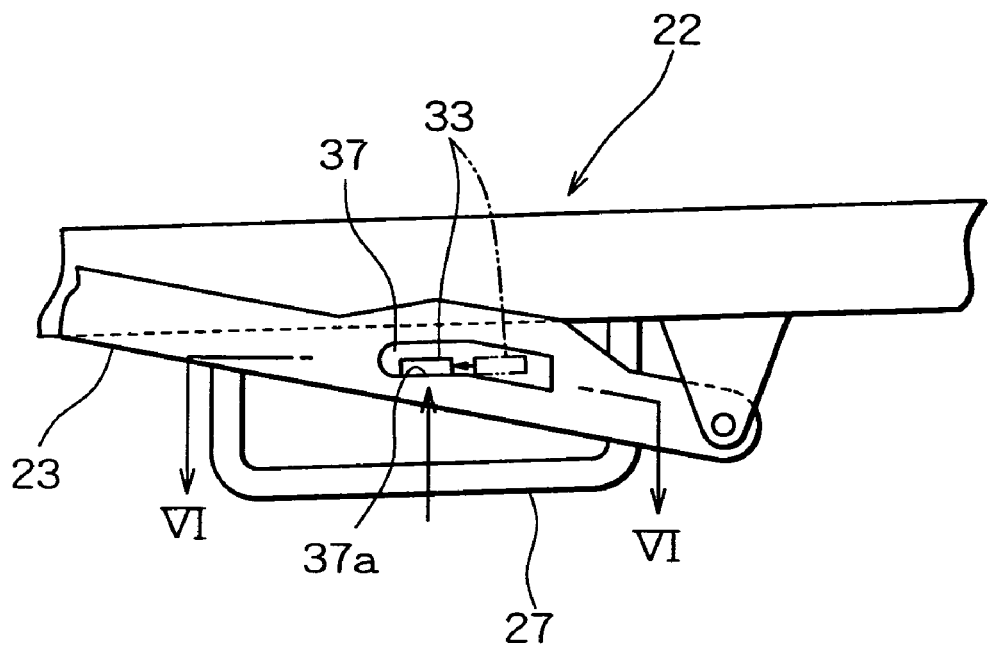
FIG. 5 is a schematic sectional view showing the locking device in a locked state when the front window is opened.
Figure 6:
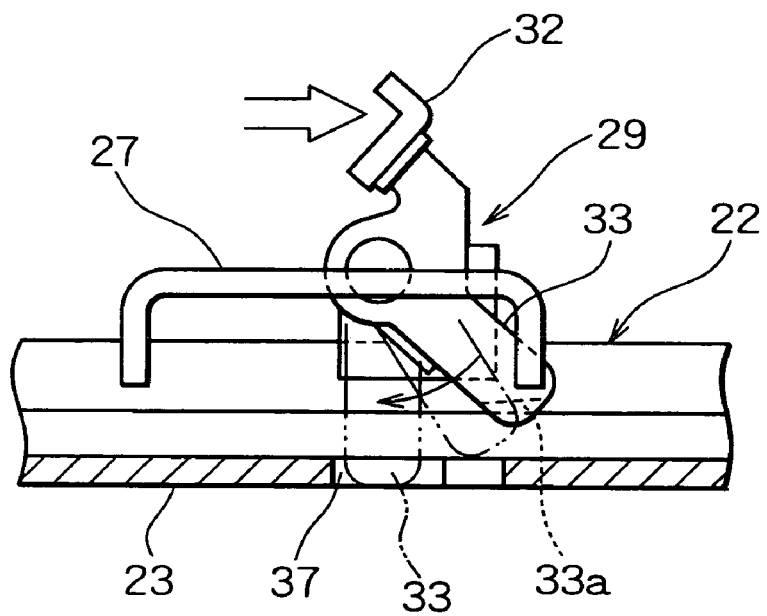
FIG. 6 is a schematic sectional view taken on line IV—IV of FIG. 5.

As shown in FIGS. 5 and 6, each of the link members 23 is equipped with an engaging hole 37 as engaging or coupling section. The locking member 29 is constituted such that it couples with the engaging hole 37 in the front window opening position. The link member 23 is one of parts, which are disposed on the side of the cabin main body. The engaging hole 37 serves as an engaging section for the front window opening position, and the engaging hole is formed such that it extends about in a longitudinal direction of the link member.

In synchronization with the movement of the front window 22 toward the opened position, the locking member 29 approaches the engaging hole 37. When the locking member 29 is operated to rotate into the locked position in the state in which the locking member 29 approaches the engaging hole 37 so as to face it, the end portion of the lock arm 33 is coupled with the hole 37. In conjunction with such a rotary operation as shown by dot line in FIG. 5, the end portion of the lock arm 33 is firstly inserted, from its one end, into the hole 37, and subsequently it is coupled with the lower surface 37a of the hole (hereinafter, referred to as engaging surface or coupling surface).

In this case, the end portion of the lock arm 33 is pressed against the engaging surface 37a through the guide surface 33a of the lock arm 33 in such a way that it becomes into tight contact the engaging surface 37a. The front window 22 is attracted to the cabin main body by means of the reaction force resulting from such a contact force by pressure to the end portion.

In the locking device according to the invention, the rotary movement of the locking member 29 disposed on the side of the front window 22 causes the lock arm 33 to be coupled to the engaging surface 30a or 37a of the coupling section (engaging member 30 or the hole 37 of the link member 23) on the side of the cabin main body, in which case, guiding action by the guide surface 33a provided with the lock arm 33 provides a pressed force against the couping surface 30a or 37a in such a manner that these members become into tight contact with each other, so that the front window 22 is attracted to the cabin main body with the aid of the reaction force due to the contact force by pressure to the members. Accordingly, such clearance as encountered in the conventional automatic engaging methods with using rods can be completely eliminated, so that the front window 22 can be firmly fixed to the cabin main body in the open position as well as in the close position, thereby enabling the generation of rattling to be securely suppressed.

In accordance with the present invention, the manual engaging system is employed, wherein the locking member 29 is coupled to the engaging member 30 or the hole 37 by its rotary operation. As a result, the locked state can be confirmed with an operator's eye directly, and further it can be sensed or felt by hand due to the above-mentioned effect of tight contact. Hence, such incomplete couplings as encountered in the prior art can be prevented, and therefore a secure lock action can be accomplished.

Since, moreover, the locking action is carried out in the vicinity of the handle 27 for opening/closing the front window, the operation of locking or unlocking can be carried out under condition that an operator grips the handle 27. The operation can be carried out in higher efficiency without interruption by other operations, compared with the case in which the operation of locking/unlocking is carried out at a position far from location of the handle 27, after opening/closing the front window. Moreover, any movement of the front window 22 resulting from the rattling thereof can be prevented, just after the handle 27 becomes free from operator's hand in the opened position.

In the embodiment, the guide surface 33a is disposed on the side of the locking member 29. In another embodiment, the guide surface can also be formed either on the side of the coupling section (the engaging member 30 or the engaging hole 37) or on both sides thereof.

Moreover, in order to decrease the slide resistance between the locking member 29 and the coupling section, a slidable member having small frictional resistance, for instance, a member made of a plastic material can be interposed between these members, which are in contact with each other. Otherwise, the contact surfaces of these members can be machined or adjusted so as to reduce frictional resistance.

In addition, the locking device according to the invention is applicable not only to the link member-opening/closing type front window as described in the above-mentioned embodiment, but also to a slide-type front window.

As described above, in accordance with the embodiment of the invention, the construction machine is constituted such that the front window for closing the front opening of the cabin main body is movable between the closed position and the opened position in which the front window faces the ceiling of the cabin, wherein the locking member having an operation knob is rotatably mounted in the window frame of the front window between the locked position where the front window is locked either in the opened position or in the closed position and the unlocked position, wherein the coupling section for the closed position and the opened position which section is coupled to the position of facing the locking member either in the closed position or in the opened position on the side of the cabin main body in the state in which the locking member overlaps the front window in the thickness direction in the locked position, and wherein a guide surface for guiding the locking member and the engaging section to become into contact in the thickness direction of the front window is provided in at least one of the engaging section and the locking member.

The handles for moving the front window between the opened position and the closed position are disposed respectively on the left and right sides of the front window. The locking member can be disposed in the vicinity of each handle where an operator can hold one of handles and the lock member simultaneously.

Moreover, an elastic body for supporting the window frame in elastic and tight contact with the window glass inside the front window can also be disposed in the vicinity of the locking member, which is provided in the window frame of the front window.

Moreover, a link member, which is rotated around the supporting point in the forward/backward direction, can be disposed in the cabin main body in such a way that the front window is movable between the opened position and the closed position in the state in which the front window is supported by the link member. In addition, a coupling hole can be disposed as a coupling section for the opened position in the link member, and further a guide surface can be formed on the coupling hole.

In the above structural arrangement, the locking action in which the locking member is coupled to the coupling section on the side of the cabin main body by rotating the locking member into the locked position is carried out in each of the closed and opened positions of the front window.

In this case, the locking member is guided along the guide surface provided in at least one of the locking member and the coupling section to become into tight contact with the coupling section in the thickness direction of the front window.

Accordingly, any clearance, from which the rattling of the coupling section results, is not generated in the locked state, and thereby the front window is fixed such that it is attracted to the cabin main body. Hence, no rattling occurs at all.

As a result, there are no troubles where the front window vibrates to generate noise, deforms and/or breakdown by works with vibration.

Since, moreover, a secure sense or feeling of coupling can be obtained by the handgrip coupling and by the above-mentioned tight contact, and further the coupling can be confirmed with an operator's eye, there are no problems of generating the incomplete coupling as encountered in the prior art, thereby enabling a secure lock to be realized.

Moreover, the provision of the handles for opening/closing the front window allows the locked portions to be disposed in the vicinity of the handles, thereby making it possible to carry out the operation of locking or unlocking in the state in which an operator grips each of the handles. Accordingly, a sequential operation of locking and unlocking can be carried out in high efficiency, compared with the case in which the operation of lock and unlock is carried out in the other position away from the handles after closing/opening the front window. At the same time, the movement downward of the front window resulting from vibration or the like when an operator lets go of each of handles in the opened position can also be prevented.

In accordance with the locking device of the invention, there is a possibility that the front window is forced to draw towards the cabin main body by the engaging the locking members to the corresponding coupling sections, so that, when the front window has a poor rigidity, the window frame might be bent due to the attractive force and therefore it results in not so much fixing force.

In this case, when an elastic member is interposed between the window frame and the window glass of the front window in the vicinity of the locking members, the window frame can be prevented from bending by the elastic member. As a result, the attractive force can be used more effectively for fixing the front window, thereby enabling a firmly locked state to be obtained for the front window.

While preferred embodiments have been shown and described, various modification and substitutions may be made within the spirit and scope of the invention. Accordingly, it is to be understood that the present invention has been described by way of example, and not by limitation.

We claim:

1. A construction machine with a front window-locking device, comprising:
   a cabin;
   a front window for closing an opening at a front part of said cabin, said front window being adapted to be movable between a closed position of fully closing said opening and an opened position of fully opening said opening;
   a locking member rotatably mounted on a window frame of said front window, said locking member being adapted to secure said front window either in said closed position or in said opened position; and
   an engaging member provided in said cabin so as to face said locking member when said front window is either in said closed position or in said opened position,
   wherein said locking member is coupled with said engaging member when said front window is either in said closed position or in said opened position so as to overlap said engaging member in a thickness direction of said front window, and wherein one of said engaging member and said locking member comprises a guide surface configured to make said locking member and said engaging member come into contact with each other on locking said front window.

2. The construction machine according to claim 1, wherein said locking member is provided with a knob for operation.

3. The construction machine according to claim 1, further comprising:
   a handle provided on each of left and right sides of said front window for moving said front window between said closed position and said opened position,
   wherein said locking member is provided in the vicinity of said handle.

4. The construction machine according to claim 1, wherein said guide surface is tapered in a thickness direction of said front window.

5. The construction machine according to claim 4, further comprising an elastic member provided in the vicinity of said locking member for supporting said window frame by coming into elastic contact with a window glass and said window frame of said front window.

6. A construction machine with a front window-locking device, comprising:
   a cabin;
   a front window for closing an opening at a front part of said cabin, said front window being adapted to be movable between a closed position of fully closing said opening and an opened position of fully opening said opening;
   locking members rotatably mounted on a window frame of said front window, said locking members being adapted to secure said front window either in said closed position or in said opened position;
   engaging members provided in said cabin so as to face said locking members either in said closed position or in said opened position, wherein said locking members are coupled with said engaging members either in said closed position or in said opened position so as to overlap said engaging members in a thickness direction of said front window, and wherein surfaces for guidance making said locking members and said engaging members come into contact with each other on locking said front window are provided in one of said engaging members and said locking members; and
   elastic members provided in the vicinity of said locking members for supporting said window frame by coming into elastic contact with a window glass and window frame of said front window.

7. The construction machine according to claim 6, wherein each of said locking members is provided with a knob for operation.

8. The construction machine according to claim 6, wherein each of said locking members is provided in the vicinity of each said handle.

9. A construction machine with a front window-locking device, comprising:
   a cabin;
   a front window for closing an opening at a front part of said cabin, said front window being adapted to be movable between a closed position of fully closing said opening and an opened position of fully opening said opening;
   locking members rotatably mounted on a window frame of said front window, said locking members being adapted to secure said front window either in said closed position or in said opened position;
   engaging members provided in said cabin so as to face said locking members either in said closed position or in said opened position, wherein said locking members are coupled with said engaging members either in said closed position or in said opened position so as to overlap said engaging members in a thickness direction of said front window, and wherein surfaces for guidance making said locking members and said engaging members come into contact with each other on locking said front window are provided in one of said engaging members and said locking members; and
   link members pivotally mounted on said cabin through a supporting point of an upper part of the cabin,
   wherein said link members have engaging sections coupled with said locking members in said opened position and wherein said front window is adapted to be movable between the closed position and the opened position with support of said link members.

10. The construction machine according to claim 9, wherein each of said engaging sections has a hole for engaging.

11. The construction machine according to claim 10, wherein a surface for guidance is formed on the hole.

* * * * *